(12) United States Patent
Oki et al.

(10) Patent No.: US 8,746,980 B2
(45) Date of Patent: Jun. 10, 2014

(54) SLIDING BEARING

(75) Inventors: Yoshio Oki, Mie (JP); Satoru Fukuzawa, Mie (JP); Kazuo Hirose, Mie (JP)

(73) Assignee: NTN Corporation, Osaka (JP)

( * ) Notice: Subject to any disclaimer, the term of this patent is extended or adjusted under 35 U.S.C. 154(b) by 6 days.

(21) Appl. No.: 13/499,261

(22) PCT Filed: Sep. 24, 2010

(86) PCT No.: PCT/JP2010/066568
§ 371 (c)(1),
(2), (4) Date: Mar. 29, 2012

(87) PCT Pub. No.: WO2011/040336
PCT Pub. Date: Apr. 7, 2011

(65) Prior Publication Data
US 2012/0183246 A1    Jul. 19, 2012

(30) Foreign Application Priority Data

Sep. 29, 2009  (JP) ................................. 2009-225443
Sep. 29, 2009  (JP) ................................. 2009-225489

(51) Int. Cl.
*F16C 23/04*  (2006.01)
*F16C 33/10*  (2006.01)

(52) U.S. Cl.
USPC .......................................... 384/213; 384/293

(58) Field of Classification Search
USPC ......... 384/192, 203, 205–213, 292, 283, 284, 384/291, 293, 432, 434, 276, 286, 288
See application file for complete search history.

(56) References Cited

U.S. PATENT DOCUMENTS

| 3,240,502 | A  | * | 3/1966 | Snyder .......................... 277/507 |
| 3,685,878 | A  | * | 8/1972 | Orkin ............................ 384/213 |
| 3,815,964 | A  | * | 6/1974 | Bendall ......................... 384/213 |
| 5,219,231 | A  | * | 6/1993 | Sheedy .......................... 384/206 |
| 6,270,259 | B1 | * | 8/2001 | Burton .......................... 384/213 |
| 2007/0014497 | A1 | * | 1/2007 | Wood et al. .................... 384/192 |

FOREIGN PATENT DOCUMENTS

| JP | 05-117678 A  | 5/1993 |
| JP | 2002-162855  | 6/2002 |
| JP | 2004-190097 A | 7/2004 |

\* cited by examiner

*Primary Examiner* — Phillip A Johnson
(74) *Attorney, Agent, or Firm* — Hedman & Costigan, P.C.; James V. Costigan; Kathleen A. Costigan

(57) ABSTRACT

The present invention provides a sliding bearing which is inexpensive, has a simple construction, and is capable of keeping a frictional torque low. A sliding bearing (1) supports a heat roller such as a fixing roller, a pressure roller, and the like of an image-forming apparatus is constructed of an outer ring (3) and an inner ring (2). The outer ring (3) is made of synthetic resin and the inner ring (2) is made of a sintered metal, or the outer ring (3) is made of a sintered metal and the inner ring is made of synthetic resin. The outer circumferential surface of the inner ring (2) is formed as a convexly curved surface, and the inner circumferential surface of the outer ring (3) is formed as a concavely curved surface corresponding to the convexly curved surface. The outer ring (3) is composed of two radially halved parts. The inner ring (2) is fitted on the outer ring (3) by sandwiching the inner ring (2) between the radially halved parts of the outer ring (3) in such a way that the inner circumferential surface of the outer ring (3) and the outer circumferential surface of the inner ring (2) slide relative to each other.

17 Claims, 8 Drawing Sheets

SLIDING BEARING

TECHNICAL FIELD

The present invention relates to a sliding bearing and more particularly to a sliding bearing to be used to support a roller (heat roller) such a fixing roller and a pressure roller of a fixing device of an image-forming apparatus such as a copying machine, a printer, a facsimile, and the like.

BACKGROUND ART

The fixing device of the image-forming apparatus attaches toner to an electrostatic latent image formed by an optical device and transfers a toner image to a sheet of copy paper and fixes the toner image thereto. In the fixing process, the toner image is passed between the fixing roller incorporating a heater and the pressure roller. Thereby a transferred image consisting of the toner image is fixed to the copy paper by means of thermal fusion.

The fixing roller is made of a soft metal and incorporates a linear or rod-like heater at its shaft center and formed in the shape of a cylinder. The shaft is projected from both ends thereof in a small diameter. The fixing roller is composed of a metal material such as aluminum or an aluminum alloy (A5056, A6063) excellent in its thermal conductivity. The surface of the fixing roller has lathe turning finish or abrasive finish. The surface of the fixing roller is coated with resin such as fluororesin or the like having a high nonadhesion. The surface the fixing roller is heated up to 180 to 250° C. by a heater.

The pressure roller is composed of an iron material or a soft material coated with silicone rubber or the like and rotatingly operated with the pressure roller pressing the copy paper against the fixing roller. The pressure roller is heated up to 70 to 150° C. by heat transferred from a heating roller. Alternatively similarly to the fixing roller, the pressure roller is heated up to 150 to 250° C. by a heater incorporated inside it.

Rollers such as the fixing roller and the pressure roller to be heated by heat transferred from the heater incorporated therein or from other members are "heat roller".

The heat roller to be heated up to high temperatures is rotatably supported by a housing via a rolling bearing consisting of a deep groove ball bearing at both ends of its shaft. A heat insulation sleeve made of synthetic resin or the like is interposed between the rolling bearing and the shaft of the heat roller. This is to prevent heat from escaping from portions of the rolling bearing disposed at both ends of the shaft of the heat roller when the heat roller is heated so that the temperature distribution along the axial direction of the heat roller does not become nonuniform and prevent the bearing from deteriorating owing to high temperatures.

An art of using a sliding bearing made of resin to support the heat roller is known. As an example of the art, the sliding bearing is formed of synthetic resin such as polyphenylene sulfide (PPS) resin, polyamide resin, polyamide-imide resin, polyimide (PT) resin, and polyether ether ketone resin. More specifically, the art of bonding fluororesin to the sliding surface of the ring-shaped bearing body made of the PPS resin excellent in its heat resistance and mechanical strength and the art of integrally molding the PPS resin mixed with fluororesin into the sliding bearing are known (see patent document 1).

When the sliding bearing made of the resin is used, generally, the heat insulation sleeve is not interposed between the sliding bearing made of the resin and the shaft of the heat roller because the sliding bearing made of the resin has heat-insulative. Normally the rolling bearing is used for the heat rollers of the fixing devices of middle-class and high-class image-forming apparatuses, whereas the sliding bearing made of the resin is used for the heat roller of the fixing device of an image-forming apparatus in widespread use.

PRIOR ART DOCUMENT

Patent Document

Patent document 1: Japanese Patent Application Laid-Open No. 5-117678

SUMMARY OF THE INVENTION

Problem to be Solved by the Invention

But the deep groove ball bearing to be used for the heat roller of the fix device of the image-forming apparatus is complicated in its construction and high in its production cost. To prevent the temperature distribution from becoming nonuniform and resin bearing from deteriorating owing to high temperatures, it is necessary to provide the heat insulation sleeve made of the resin between the deep groove ball bearing and the shaft of the heat roller. Thus the fixing device is expensive. Moreover there is a fear that the bearing is broken owing to the flexure of the supporting shaft of the heat roller caused by a moment load and an error in accuracy in mounting the supporting shaft of the heat roller on the housing.

To the contrary, the sliding bearing made of the resin such as the PPS resin can be used without interposing the heat insulation sleeve between the sliding bearing and the shaft of the heat roller. Further this sliding bearing has a simple construction, and can be injection-molded and thus can be produced at a low cost. But this sliding bearing has a problem that it has a friction torque two to five times higher than that of the deep groove ball bearing. When the roughness of the sliding surface of the heat roller on which the bearing slides is large, the bearing has a larger friction torque and at the same time, wears greatly. Thus this sliding bearing is incapable of satisfying the specification.

Even though grease is applied to the sliding surface of the bearing to decrease its friction torque, the grease becomes insufficient at a portion of the bearing to be subjected to a high load. Thus the bearing incapable of satisfying the specification.

The present invention has been made to cope with the above-described problems. It is an object of the present invention to provide a sliding bearing which is inexpensive, has a simple construction, and is capable of keeping a frictional torque low.

Means for Solving the Problem

The sliding bearing of the present invention is constructed of an outer ring and an inner ring, wherein the outer ring is made of synthetic resin and the inner ring is made of a sintered metal, or the outer ring is made of a sintered metal and the inner ring is made of a synthetic resin; and an inner circumferential surface of the outer ring and an outer circumferential surface of the inner ring slide relative to each other. The sliding hearing supports a heat roller to be heated by heat transferred from a heater incorporated in the heat roller or from other members.

The outer circumferential surface of the inner ring is formed as a convexly curved surface, and the inner circumferential surface of the outer ring is formed as a concavely curved surface corresponding to the convexly curved surface. The outer ring is composed of two radially divided parts; and the inner ring is fitted on the outer ring by sandwiching the inner ring between the two divided parts of the outer ring in such a way that the inner circumferential surface of the outer ring and the outer circumferential surface of the inner ring slide relative to each other.

As another mode of the present invention, an inner ring fit-on groove is formed at two opposed positions of the inner circumferential surface of the outer ring in such a way that the inner ring fit-on groove is disposed on at least one end surface of the outer ring; and the inner ring is fitted on the outer ring through the inner ring fit-on groove. The inner ring is fitted on the outer ring by inserting the inner ring into the outer ring in a state where the axis of the inner and that of the outer ring are shifted from each other and thereafter rotating the inner ring and the outer ring relative to each other to align the axis of the inner ring and that of the outer ring with each other.

Grease is enclosed between the inner ring and the outer ring; and a grease-holding concave portion for holding the grease therein is formed on the outer circumferential surface of the inner ring. A depth of the grease-holding concave portion at a deepest portion thereof is 0.03 to 0.7 mm.

The grease-holding concave portion is formed as inverted cone-shaped dimples, having a diameter of 0.3 to 2.0 mm, which are formed on an entire outer circumferential surface of the inner ring. Each of the dimples has an approach angle of 10 to 45° at an open portion thereof.

The grease-holding concave portion is formed on an entire outer circumferential surface of the inner ring as a plurality of rectangular grooves arranged in two rows in such a way that the rectangular grooves form a plurality of characters of mark " ∕\ " and that a lower side of each of the characters of " ∕\ " faces a rotational direction of the inner ring. Each of the rectangular grooves is formed as an inclined groove which becomes gradually deeper from a side of the rectangle facing the rotational direction of the inner ring toward an opposed side thereof.

The synthetic resin is a resin composition containing a solid lubricant. A base resin of the resin composition is PPS resin.

The sintered metal contains copper (Cu) and/or iron (Fe) as a main component thereof.

The grease is fluorine grease and/or urea grease.

Effect of the Invention

The sliding bearing of the present invention is constructed of the outer ring and the inner ring. The outer ring is made of the synthetic resin and the inner ring is made of the sintered metal, or the outer ring is made of the sintered metal and the inner ring is made of the synthetic resin. The inner circumferential surface of the outer ring and the outer circumferential surface of the inner ring slide relative to each other. Therefore a smaller number of parts are used for the sliding bearing of the present invention than the conventional rolling bearing. Thus the former has a simpler construction than the latter. For this reason, the process for producing the former is simpler than the process for producing the latter. Therefore the cost for producing the former is less expensive than the cost for producing the latter. Because either one of the outer ring or the inner ring is made of the synthetic resin, the sliding bearing has a high heat insulation effect and thus the heat efficiency of the heat roller does not lower. Further because the other of the outer ring and the inner ring is made of the sintered metal, the sliding bearing has a high heat release effect and thus a long life. Further because the sliding bearing is constructed of the outer ring and the inner ring, the sliding bearing can be formed in the same size as that of the conventional rolling bearing and is replaceable with the rolling bearing and thus compatible therewith.

The above-described sliding bearing can be preferably utilized as a bearing for supporting the heat roller such as the roller or the pressure roller of the image-forming apparatus to be heated by heat transferred from a heater incorporated therein or from other members.

Because the outer circumferential surface of the inner ring is formed as the convexly curved surface, and the inner circumferential surface of the outer ring is formed as the concavely curved surface corresponding to the convexly curved surface, the axis of the outer ring can be aligned with that of the inner ring. Therefore even though the supporting shaft is flexed owing to a moment load or an error in accuracy in mounting the supporting shaft of the heat roller on a housing, the bearing is not broken.

The outer ring is composed of the two radially halved parts. The inner ring is fitted on the outer ring by sandwiching the inner ring between the two halved parts of the outer ring in such a way that the inner circumferential surface of the outer ring and the outer circumferential surface of the inner ring slide relative to each other. Therefore the sliding bearing can be favorably mounted on the supporting shaft. When the outer circumferential surface of the inner ring is formed as the convexly curved surface and when the inner circumferential surface of the outer ring is formed as the concavely curved surface corresponding to the convexly curved surface, the sliding bearing can be favorably mounted on the supporting shaft. In the case where the grease-holding concave portion is formed on the outer circumferential surface of the inner ring, the inner ring can be sandwiched between the two halved parts of the outer ring after grease is sufficiently applied to the grease-holding concave portion.

The inner ring fit-on groove is formed at the two opposed positions of the inner circumferential surface of the outer ring. The inner ring fit-on groove is disposed on at least one end surface of the outer ring. The inner ring is fitted on the outer ring through the inner ring fit-on groove. Therefore without dividing the outer ring into two or more parts, the inner ring can be fitted on the outer ring. The inner ring is fitted on the outer ring by inserting the inner ring into the outer ring via the inner ring fit-on groove in the state in which the axis of the inner ring and that of the outer ring are shifted from each other and thereafter by rotating the inner ring and the outer ring relative to each other to align the axis of the inner ring and that of the outer ring with each other. Therefore the inner ring can be fitted on the outer ring without elastically deforming the inner ring and the outer ring.

The grease is enclosed between the inner ring and the outer ring. The grease-holding concave portion for holding the grease therein is formed on the outer circumferential surface of the inner ring. Therefore the grease is held by the grease-holding concave portion and capable of keeping the friction torque of the sliding bearing low. Because the depth of the grease-holding concave portion at the deepest portion thereof is 0.03 to 0.7 mm, the grease-holding concave portion is capable of holding the grease therein sufficiently and efficiently.

The grease-holding concave portion is formed as the inverted cone-shaped dimples, having the diameter of 0.3 to 2.0 mm, which are formed on the entire outer circumferential surface of the inner ring. Therefore owing to a wedge effect, the grease can be supplied to the sliding surface. Each of the dimples has an approach angle of 10 to 45° at an open portion thereof. Therefore the grease-holding concave portion has a high wedge effect.

The grease-holding concave portion is formed on the entire outer circumferential surface of the inner ring as the rectangular grooves arranged in the two rows in such a way that the rectangular grooves form a plurality of characters of mark "⁄\" and that the lower side of each character of mark "⁄\" faces the rotational direction of the inner ring. Therefore when the inner ring rotates, the grease is always scraped from the lower sides of the grooves forming the character of mark "⁄\" toward the upper sides thereof, namely, toward the central portion of the bearing in its width direction. Therefore a film of the grease is easily and continuously formed at the central portion of the bearing in its width direction to be subjected to the grease load, which allows the bearing to rotate smoothly at a low friction torque. Each of a plurality of the rectangular grease-holding grooves is formed as the inclined groove which becomes gradually deeper from the side of the rectangle facing the rotational direction of the inner ring toward the opposed side thereof. Therefore the grease can be easily scraped, so that the above-described effect is improved.

The synthetic resin forming either one of the outer ring or the inner ring is the resin composition containing the solid lubricant. Therefore the rotational torque is stable without lubrication. Even in the case where grease lubrication is adopted, the rotational torque is prevented from abnormally increasing when the grease runs short.

Because the base resin of the resin composition is the PPS resin, the sliding bearing can be used to support the fixing roller and the pressure roller of the image-forming apparatus without interposing the heat insulation sleeve between the sliding bearing and the shaft of the fixing roller or that the pressure roller. Further because the PPS resin can be injection-molded, the sliding bearing can be produced at a low cost.

The sintered metal forming the other of the outer ring and the inner ring contains copper or iron as its main component or contains both of the copper and the iron as its main component. Therefore the sliding bearing is excellent in its heat releasability. Further the sliding bearing can be easily produced by compression-molding and thus has a small dimensional change. Therefore the sliding bearing can be produced at a low cost.

Because the grease to be enclosed between the inner ring and the outer ring and in the grease-holding concave portion is the fluorine grease and/or the urea grease, in the case where the sliding bearing is used to support the heat roller, the sliding bearing is capable of lengthening the life of the heat roller. In the case where the sliding bearing is used to support the fixing roller of the image-forming apparatus, the sliding bearing does not deteriorate at a fixing temperature.

By composing the inner ring of the sintered metal and the outer ring of the synthetic resin, the entire bearing is unlikely to be subjected to the influence of thermal expansion, and the outer ring is prevented from locally wearing. By composing the inner ring of the synthetic resin and the outer ring of the sintered metal, the heat efficiency of the heat roller is prevented from deteriorating. Thus the energy cost can be decreased.

MODE FOR CARRYING OUT THE INVENTION

Figure 1:
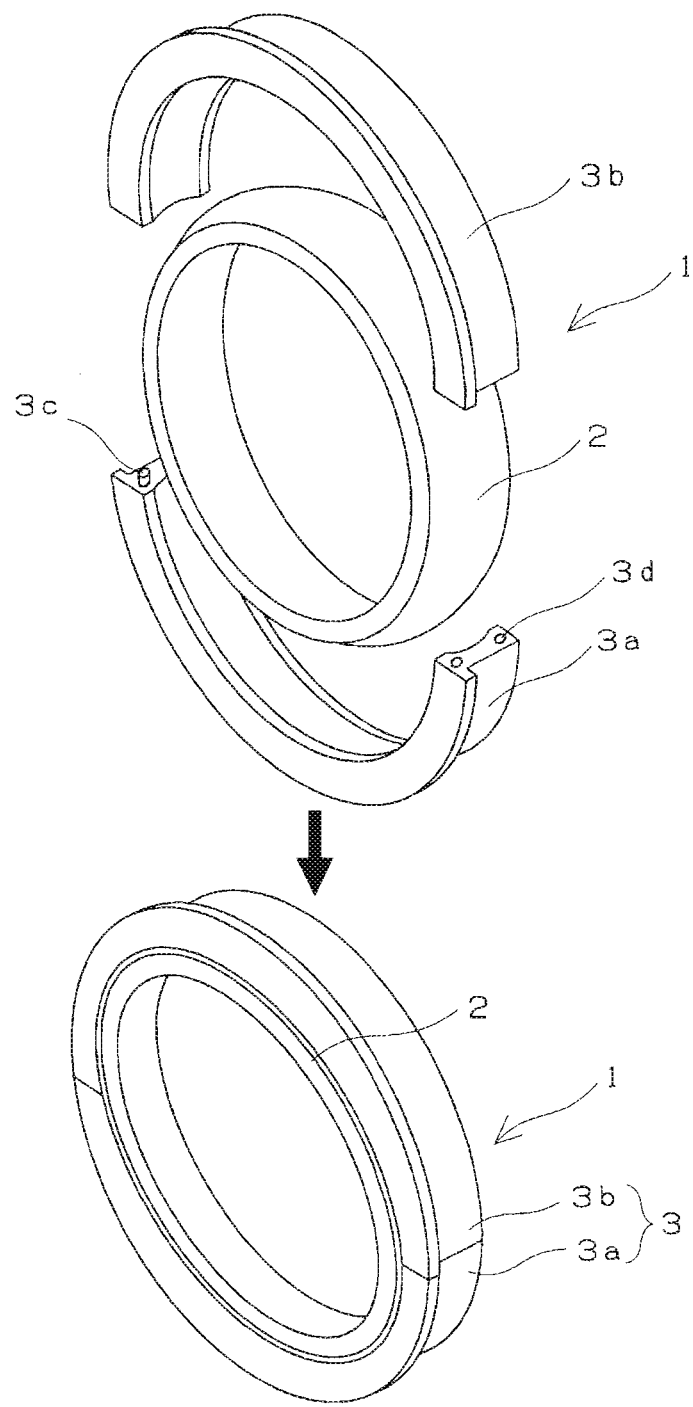
FIG. 1 is a perspective view of a sliding bearing of one embodiment of the present invention and a perspective view showing a state before an outer ring is fitted on an inner ring.

In the sliding bearing of the present invention, either an outer ring or an inner ring is made of synthetic resin. The kind of the synthetic resin is not limited to a specific one, but it is necessary that the synthetic resin has properties suitable for the use conditions (heat resistance, mechanical strength, and the like) of the sliding bearing. Injection-moldable synthetic resin can be produced easily at a uniform dimensional accuracy and is thus preferable in controlling the gap between the outer ring and the inner ring to be fitted on each other.

As the synthetic resin, it is possible to list polyacetal (POM) resin, nylon resin (nylon 6, nylon 66, nylon 610, nylon 612, nylon 11, nylon 12, nylon 46, and semiaromatic nylon having aromatic ring in molecular chain); injection-moldable fluororesin such as polytetrafluoroethylene-fluoroalkyl vinyl ether copolymer (PEA) resin, tetrafluoroethylene-hexafluoropropylene copolymer (FEP) resin, and ethylene-tetrafluoroethylene copolymer (ETFE) resin; and injection-moldable resin such as PI resin, PPS resin, wholly aromatic polyester resin, PEEK resin, and polyamide imide resin. These synthetic resins can be used singly or as polymer alloys each consisting of a combination of not less than two kinds thereof. Alternatively it is possible to use polymer alloys each consisting of a mixture of synthetic resin, other than the above-described synthetic resins, having a low lubrication property and any of the above-described synthetic resins.

Of these synthetic resins, it is preferable to use the PPS resin excellent in its heat resistance, mechanical strength, and comparatively inexpensive. By using the PPS resin, the sliding bearing of the present invention can be preferably used to support a fixing roller and the like of an image-forming apparatus which is operated at high temperatures.

The strengths of these synthetic resins can be enhanced by adding glass fiber, carbon fiber or various mineral fibers (whisker) thereto. The lubrication properties of these synthetic resins can be enhanced by adding a solid lubricant or lubricating oil thereto. As the solid lubricant, it is possible to list polytetrafluoroethylene (PTFE) resin, graphite, and molybdenum disulfide.

In the sliding bearing of the present invention, either one of the outer ring or the inner ring is made of the synthetic resin, whereas the other is made of the sintered metal. The kind of the sintered metal is not limited to a specific one, but it is possible to use alloys such as a Fe-based alloy, a Cu-based alloy, a Fe—Cu-based alloy, Cu-tin (Sn)-based alloy, and Cu—Fe—Sn-based ahoy. It is also possible to use the above-described sintered metals to which carbon, graphite or molybdenum disulfide is added. Of these sintered metals, is preferable that the sintered metal contains at least one metal selected from Cu and Fe as its main component, because Cu and Fe are excellent in the heat releasability thereof, can be easily produced by compression molding, are small in the dimensional change thereof, and can be produced at low costs.

In the case where the sintered metal is adopted for the inner ring, and the synthetic resin is used for the outer ring, the entire sliding bearing is unlikely to be subjected to the influence of thermal expansion and thus the outer ring does not locally wear. In the case where the synthetic resin is adopted for the inner ring, and the sintered metal is used for the outer ring, it is possible to restrain a decrease in the thermal efficiency of a heat roller and decrease the energy cost of the fixing device.

Figure 2:
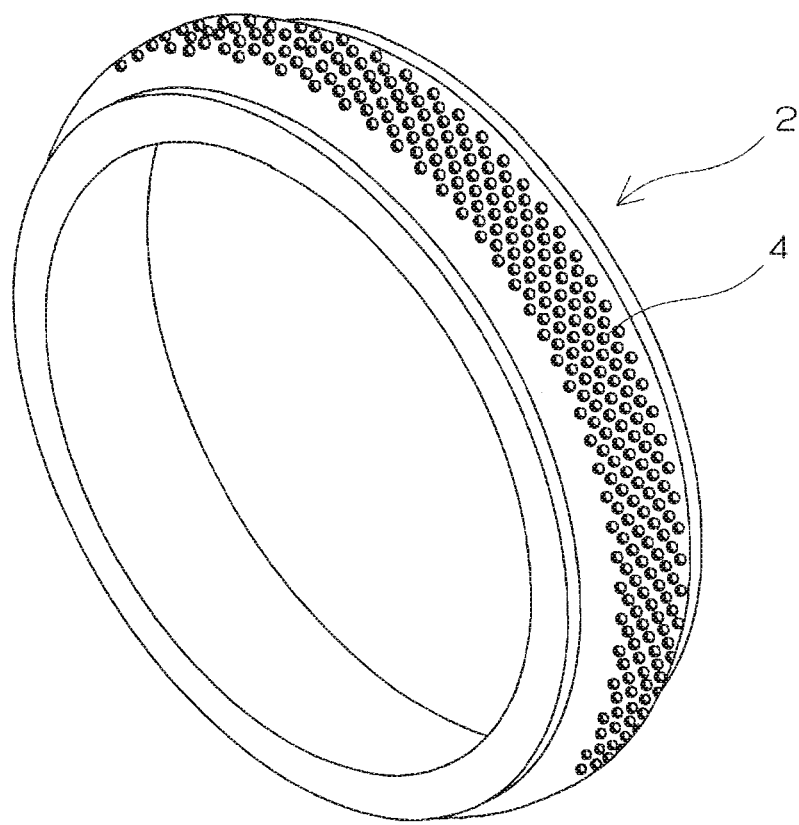
FIG. 2 is a front view showing an example of a grease-holding concave portion formed on a sliding surface of an outer circumferential surface of an inner ring of the sliding bearing.
Figure 4:
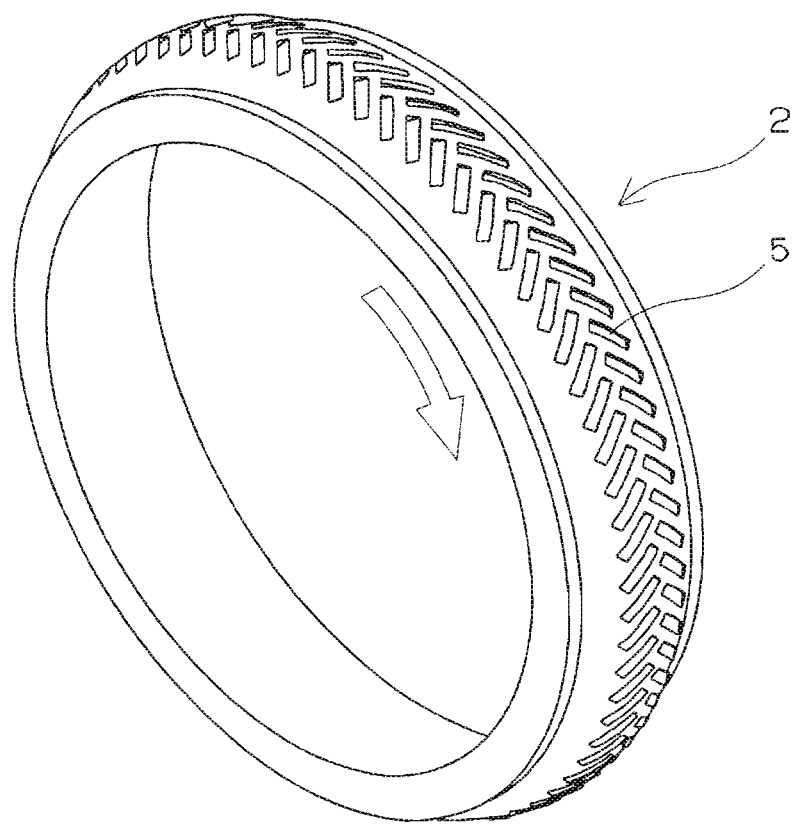
FIG. 4 is a perspective view showing another example of the grease-holding concave portion formed on the sliding surface of the outer circumferential surface of the inner ring of the sliding bearing.

One embodiment of the sliding hearing of the present invention is described below with reference to the drawings. FIG. 1 is a perspective view of the sliding bearing of the present invention and a perspective view showing a state before the inner ring and the outer ring are combined with each other. A sliding bearing 1 of the present invention is composed of only an inner ring (overall view of the inner ring 2 is shown in FIG. 2 or 4) and an outer ring 3. The inner circumferential surface of the outer ring 3 and the outer circumferential surface of the inner ring 2 slide relative to each other. A sliding surface of the inner circumferential surface of the outer ring 3 and that of the outer circumferential surface of the inner ring 2 may be cylindrical and axially flat. But as shown in FIG. 1, the axis of the inner ring 2 and that of the outer ring 3 can be preferably aligned with each other by forming the outer circumferential surface of the inner ring 2 as a convexly curved surface and the inner circumferential surface of the outer ring 3 as a concavely curved surface corresponding to the convexly curved surface. In this case, by forming the widthwise central portion (maximum diameter portion) of the entire convexly curved outer circumferential surface of the inner ring 2 as a flat surface, it is unnecessary to treat a parting line (PL) later, even though a parting line (PL) set at the widthwise central portion of the inner ring 2 in forming the inner ring 2 by injection molding.

As shown in FIG. 1, the outer ring 3 of the sliding bearing is composed of two radially halved parts. The inner ring 2 fitted on the outer ring 3 by sandwiching the inner ring 2 between the two halved parts, namely, a lower part 3a of the outer ring 3 and an upper part 3b thereof in such a way that the inner circumferential surface of the outer ring 3 and the outer circumferential surface of the inner ring 2 slide on each other.

As shown in FIG. 1, pins 3c are formed on one of the radial surfaces of the lower part 3a of the outer ring 3 formed by radially halving the outer ring 3, whereas pin holes 3d are formed on the other of the radial surfaces of the lower part 3a thereof at bilateral symmetrical positions. Pin holes corresponding to the pins 3c are formed on one of the two radial surfaces of the upper part 3h of the outer ring 3 formed by radially halving the outer ring 3, whereas pins corresponding to the pin holes 3d are formed on the other of the two radial surfaces of the upper part 3b of the outer ring 3. By constructing the outer ring 3 in this way, the lower part 3a of the outer ring 3 and the upper part 3b thereof can be used as common moldings. The outer ring 3 having a flange as shown in FIG. 1 prevents the front of the outer ring 3 from being mistaken for the back thereof or vice versa and thus the inner ring 2 and the outer ring 3 from being erroneously fitted on each other. Therefore the outer ring 3 having the flange 3 is excellent in a combining workability. The lower part 3a of the outer ring 3 and the upper part 3b thereof can be easily combined with each other by fitting the inner ring 2 on the lower part 3a of the outer ring 3 and thereafter fitting the pins 3c of the lower part 3a of the outer ring 3 into the pin holes of the upper part 3b thereof and the pins of the upper part 3b of the outer ring into the pin holes 3d of the lower part 3a thereof.

Figure 7:
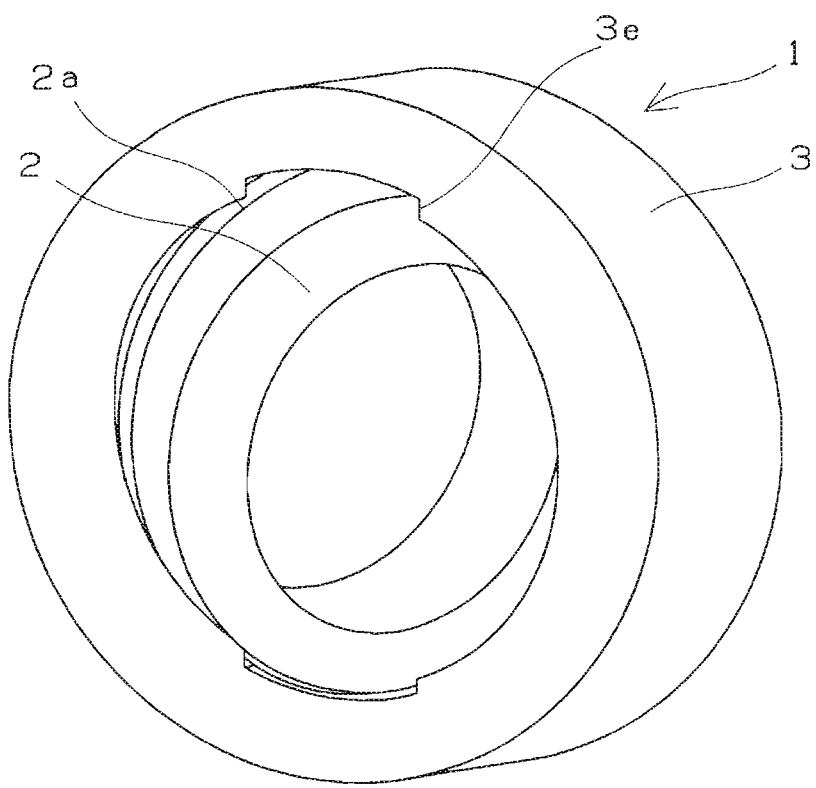
FIG. 7 is a perspective view showing another mode of the sliding bearing of the present invention.

Although the case in which the outer ring 3 is halved has been described, is possible to divide the outer ring 3 into three parts or more. When the sliding bearing 1 is so constructed that the inner ring 2 can be fitted on the outer ring 3, the outer ring 3 may have a construction which is not divided. For example, as shown in FIG. 7, the sliding bearing 1 may have a construction composed of the outer ring 3 having a concavely curved inner circumferential surface where an inner ring fit-on groove 3e is formed at two positions opposed to each other and of the inner ring 2 having a convexly curved outer circumferential surface corresponding to the concavely curved surface. This construction allows the inner ring 2 to be fitted on the outer ring 3 by inserting the inner ring 2 into the outer ring 3 from the inner ring fit-on groove 3e by shifting the axis of the inner ring 2 and that of the outer ring 3 from each other by 90 degrees and thereafter rotating the inner ring 2 and the outer ring 3 relative to each other to align the axis of the inner ring 2 and that of the outer ring 3 with each other.

In the case where grease lubrication is adopted, to hold grease on a sliding surface and supply it thereto, it is preferable to form a grease-hold concave portion on the sliding surface of the inner ring and/or that of the outer ring. The grease-holding concave portion should be so designed that the grease is accommodated in the sliding surface of the inner ring 2 and that of the outer ring 3 to prevent the grease from leaking from the sliding bearing 1. In the case where the grease-holding concave portion is formed on the inner ring 2, it is preferable to fit the inner ring 2 having the grease sufficiently applied (enclosed) to the grease-holds concave portion thereof in advance on the outer ring 3 in combining the inner ring 2 and the outer ring 3 with each other.

It is preferable that the depth of the grease-holding concave portion at the deepest portion thereof is set to 0.03 to 0.7 mm. The depth is the distance from the outer circumferential surface (surface) of the inner ring 2 to the bottom of the concave portion in the case where the grease-holding concave-portion is formed on the inner ring 20. When the bottom of the concave portion inclines, it is preferable to set the depth of the deepest portion to the above-described range. When the depth of the concave portion is less than 0.03 mm, the concave portion is so shallow that the concave portion is incapable of holding the grease in an amount sufficient for lubrication. When the depth of the concave portion is more than 0.7 mm, the concave portion is so deep that the grease collects at the bottom of the concave portion and thus there is an increase in the amount of the grease which does not contribute to the lubrication.

Figure 3:
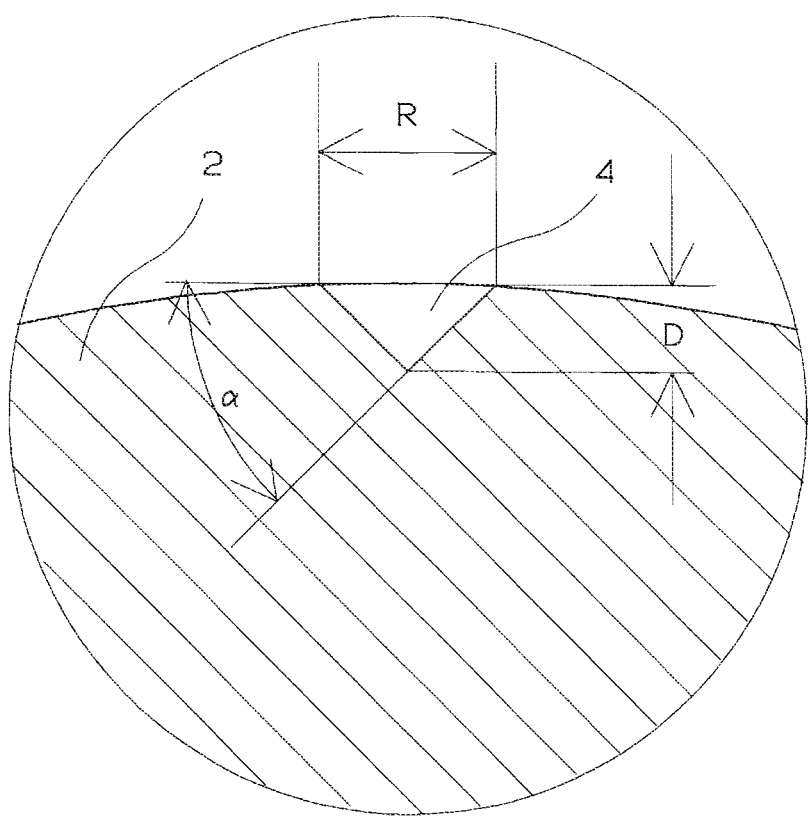
FIG. 3 is an enlarged sectional view of the grease-holding concave portion shown in FIG. 2.

As a favorable grease-holding concave portion, dimples as shown in FIG. 2 can be exemplified. FIG. 3 is a sectional view of one of the dimples shown in FIG. 2. A plurality of dimples forming the grease-holding concave portion shown in FIGS. 2 and 3 is formed on the entire outer circumferential surface of the inner ring 2. Each dimple 4 has the shape of an inverted cone having a predetermined diameter R. Because the dimple 4 is inverted cone-shaped, the grease can be efficiently supplied to a lubrication surface owing to a wedge effect caused by the rotation of the inner ring 2. By forming the grease-holding concave portion as the dimple 4, the sliding bearing 1 can be mounted on the rotating shaft of the heat roller or the like irrespective of a direction in which the inner ring 2 is mounted on the rotating shaft. In the case where both end portions of the rotating shaft are supported, common moldings of the sliding bearing can be used.

The diameter R of each dimple 4 is set to 0.3 to 2.0 mm. When the diameter R of the dimple 4 is less than 0.3 mm, the dimple 4 has a low grease-holding performance. When the diameter R of the dimple exceeds 2.0 mm, there is an increase in the amount of the grease which does not contribute to the lubrication.

It is preferable to set an approach angle α of each dimple 4 to 10 to 45°. When the approach angle α is less than 10°, it is not easy to form the dimple 4. When the approach angle α exceeds 45°, there is a fear that the wedge effect cannot be obtained. In the case where the dimple 4 is so designed that the diameter thereof is 2.0 mm and that the approach angle α thereof is 45°, the depth of the concave portion can be set to not more than 0.7 mm by flattening the bottom thereof.

Another preferable grease-holding concave portion is shown in FIG. 4. In FIG. 4, the direction shown with the solid white arrow is the rotational direction of the inner ring 2. The grease-holding concave portion shown in FIG. 4 is formed on the entire outer circumferential surface of the inner ring 2 as rectangular grooves 5 arranged in two rows in such a way that said rectangular grooves form an angled pattern where each pair of said rectangular grooves of said two rows converge towards one another at a first end but do not contact one another and each pair of said rectangular grooves, at a second end are spaced further apart than at said first end to form said angled pattern, said second end of each pair of rectangular grooves being positioned to face a rotational direction of said inner ring. When the inner ring 2 rotates, the grease enclosed between the inner ring 2 and the outer ring 3 moves inside each groove 5 with the grease being scraped from the lower side of each pair of rectangular grooves toward the upper side thereof. Because the first end of each pair of rectangular grooves is positioned at the central portion 2a of the inner ring 2 in its width direction, the grease moves to the central portion 2a (see FIG. 5). When the inner ring 2 rotates means when the inner ring 2 rotates relative to the outer ring 3 and also includes the case in which the inner ring 2 is stationary and the outer ring 3 rotates.

Figure 5:
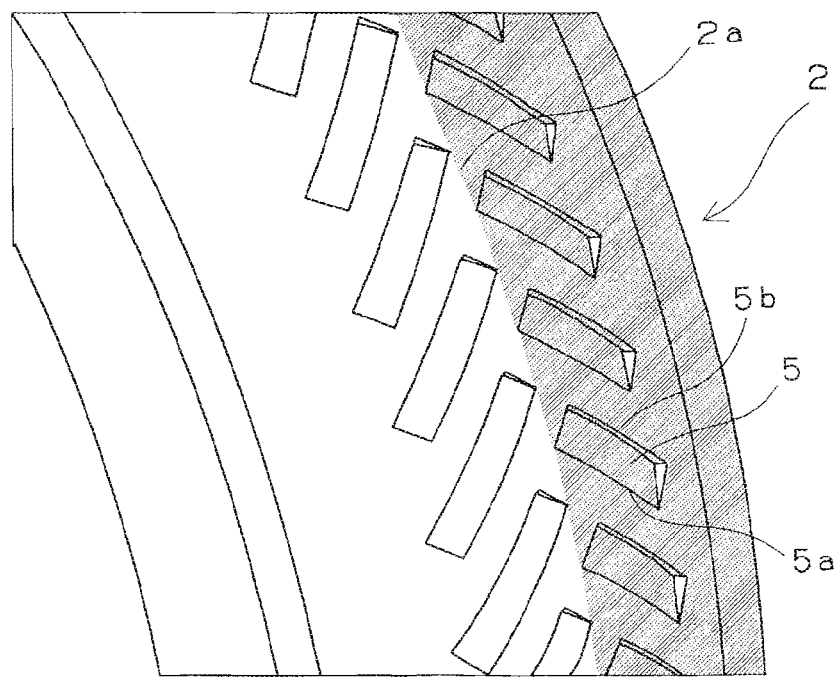
FIG. 5 is a partly enlarged perspective view of the grease-holding concave portion shown in FIG. 4.

As shown in FIG. 5, it is preferable to form the grease-holding groove 5 as an inclined groove which becomes gradually deeper from a side 5a of the rectangle disposed at the side in the rotational direction of the inner ring 2 toward an opposed side 5b thereof. By deepening the groove 5 from the side in the rotational direction of the inner ring 2 toward the side opposite to the rotational direction thereof, when the inner ring 2 rotates, the grease can be scraped more easily than the case in which the groove 5 is not inclined in the above-described direction. Care should be taken when the sliding bearing where the grease-holding concave portion shown in FIGS. 4 and 5 is formed supports both end portions of the rotating shaft, because the direction in which the sliding bearing is mounted on the rotational shaft of the heat roller and the like is determined according to the rotational direction thereof.

By forming the above-described grease-holding concave portion (dimple 4, groove 5) on the outer circumferential surface of the inner ring 2, a film of the grease is easily and continuously formed at the central portion, of the bearing (inner ring) in its width direction, which is subjected to the largest load. Thus the inner ring 2 is capable of rotating smoothly at a low friction torque. Although the case in which the grease-holding concave portion is formed on the outer circumferential surface of the inner ring 2 has been exemplified in FIGS. 2, 4, and 5, the grease-holding concave portion can be formed on the inner circumferential surface of the outer ring 3.

In the sliding bearing of the present invention, as the grease to be enclosed between the inner ring and the outer ring and in the grease-holding concave portion, grease normally used for a bearing can be used without specific limitations. As base oil composing the grease, hydrocarbon-based synthetic oil such as mineral oil including paraffin-based mineral oil and naphthene-based mineral oil, polybutene oil, poly-α-olefin oil, alkylbenzene oil, alkylnaphthalene oil, and alicyclic compounds; and nonhydrocarbon-based synthetic oil such as natural fat, polyol ester oil, phosphate ester oil, diester oil, polyglycol oil, silicone oil, polyphenyl ether oil, alkyldiphenyl ether oil, and fluorinated oil. These base oils can be used singly or in combination of not less two kinds thereof.

As thickeners composing the grease, metal soap-based thickeners such as aluminum soap, lithium soap, sodium soap, composite lithium soap, composite calcium soap, and composite aluminum soap; urea-based compounds such as diurea compounds and polyurea compounds; and fluororesin powder such as PTFE resin are listed. These thickeners can be used singly or in combination of not less than two kinds thereof.

Because the sliding bearing of the present invention is used to support fixing roller and the like of the image-forming apparatus which operates at high temperatures, the grease is required to have heat resistance. Therefore it is preferable to use fluorine grease composed of the fluorinated oil serving as its base oil and the fluororesin powder serving as its thickener or urea grease containing the urea-based compound serving as its thickener. It is possible to use grease consisting of a mixture of the fluorine grease and the urea grease. Each of the above-described grease is capable of containing known additives as necessary.

EXAMPLES

Synthetic resins and sintered metals composed of materials shown below were used in the examples and the comparative examples.

(1) synthetic resin: 52 wt % of PPS resin, 33 wt % of PTFE resin, and 15 wt % of graphite (2) sintered metal: 60 wt % of Fe, 35 wt % of Cu, and 5 wt % of Sn (porosity: 20%)

(3) fluorine grease: Krytox GPL205 produced by DuPont Inc. Examples 1 through 3 and Comparative Examples 1 and 2

Specimens of sliding bearings (sliding bearing shown in FIG. 1) composed of the synthetic resin, the sintered metal, and the fluorine grease shown in table 1 and having the grease-holding concave portion were prepared. Each specimen had φ25 mm in the inside diameter of the inner ring (convex curvature R: 15.5 mm) thereof, φ37 mm in the outside diameter of the outer ring (concave curvature R: 15.5 mm) thereof, and 7 mm in the width thereof. These specimens were subjected to a friction and wear test shown below to measure the dynamic friction coefficients thereof. The results are shown in table 1. The amount of the grease used in each of the examples 2, 3 and the comparative example 2 was 1 g.

<Friction and Wear Test>

Figure 6:
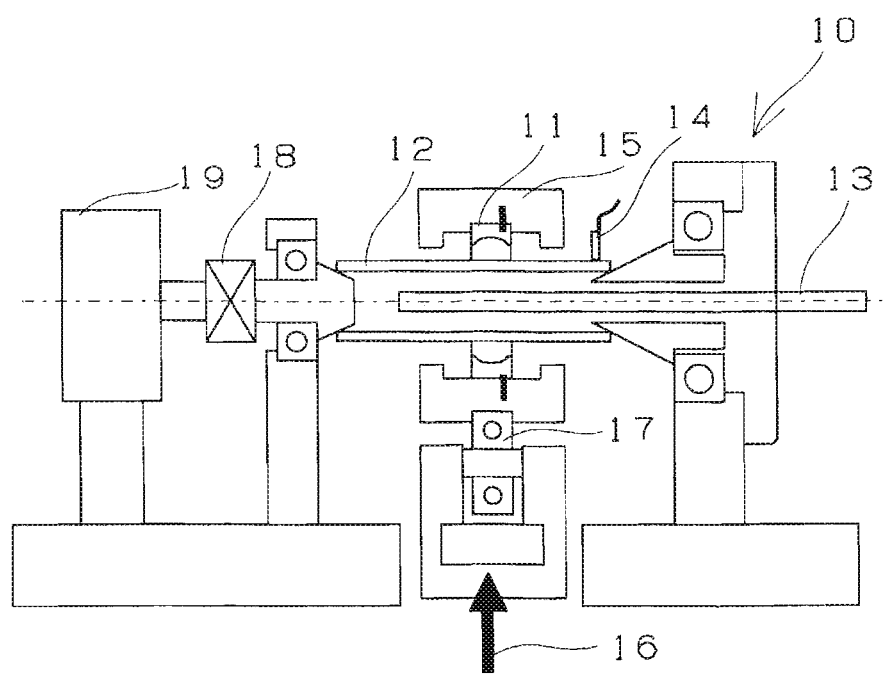
FIG. 6 is a schematic view of a shaft-heating type high temperature radial testing machine.

By using a shaft-heating type radial testing machine 10 shown in FIG. 6, the dynamic friction coefficients of sliding bearings 11 were measured. A rod-like heater 13 heated the inside diameter of a fixing roller 12 of the shaft-heating type radial testing machine 10 produced by imitating a fixing roller of a fixing device of a copying machine. The surface temperature of the fixing roller 12 was controlled at 200° C. by a thermocouple 14. In the test, the sliding bearing 11 was mounted inside a housing 15. The fixing roller 12 inserted into the inside diameter-portion of the sliding bearing 11 was pressed upward from a lower part of the housing 15, and thereafter a load 16 of 300N was applied to the fixing roller 12 via a ball bearing 17. By using a product formed by lathe turning (surface roughness Ra: 0.5 to 0.7 μm) made of aluminum alloy (A5052) for the fixing roller 12, the shaft-heating type radial testing machine 10 was operated for 200 hours via a coupling 18 by keeping the number of rotations of the fixing roller 12 at 60 rpm. The dynamic friction coefficients of the sliding bearings 11 at the initial stage and at the time after the elapse of 200 hours were calculated by measuring the rotational forces of the housing 15 which rotated together with the sliding bearings 11 by a load cell (not shown in the drawings). Reference numeral 19 shown in FIG. 6 denotes a driving motor.

composition), produced by NTN Engineering Plastics Corporation, which is precision resin was used. The outer ring shown in FIG. 1 was produced by injection-molding BEAREE AS5040, produced by NTN Engineering Plastics Corporation, which is a synthetic resin material composed of the PPS resin reinforced with glass fiber. The obtained sliding bearing had dimensions of φ30 mm in the inside diameter of its inner ring (convex curvature R: 16.75 mm), φ37 mm in the outside diameter of its outer ring (convex curvature R: 16.75 mm, outside diameter of flange: φ39 mm) thereof, and 7 mm in its total width (width of flange: 1 mm). As grease, 5 g of fluorine grease (Krytox GPL205 produced by DuPont Inc.) was uniformly applied to the grease-holding concave portion formed on the inner ring. Thereafter the inner ring was fitted on the outer ring to obtain a sliding bearing 11. The obtained sliding bearing 11 was subjected to a rotational torque test shown below to determine the rotational torque thereof. The

TABLE 1

|  | Example | | | Comparativeexample | |
| --- | --- | --- | --- | --- | --- |
|  | 1 | 2 | 3 | 1 | 2 |
| inner ring | synthetic resin | synthetic resin | sintered metal | synthetic resin | sintered metal |
| outer ring | sintered metal | sintered metal | synthetic resin | synthetic resin | sintered metal |
| fluorine grease | not contained | contained | contained | not contained | contained |
| grease-holding concave portion | — | FIG. 2 | FIG. 4 | — | FIG. 4 |
| dynamic coefficient friction |  |  |  |  |  |
| initial stage | 0.11 | 0.06 | 0.06 | 0.10 | 0.08 |
| after lapse of 200 hours | 0.15 | 0.09 | 0.09 | 0.32 | 0.24 |

As a result of the friction and wear test, the sliding bearing of the example 1 had a high dynamic friction coefficient due to non-lubrication, but the dynamic friction coefficient thereof little rose after the lapse of 200 hours. It is conceivable that the transfer film of the resin formed on the sliding surface of the sliding bearing allowed the dynamic friction on coefficient thereof to be stable. The sliding bearings of the examples 2 and 3 were low and stable in the dynamic coefficient frictions thereof owing to the grease lubrication, and it was found that the sliding surface of the sliding bearing little wore after the lapse of 200 hours from the start time. On the other hand, after the lapse of 200 hours, the dynamic friction coefficient of the sliding bearing of the comparative example 1 in which the inner rang and the outer ring were made of the synthetic resin and which was operated without lubrication became not less than three times as high as the dynamic friction coefficient thereof at the initial stage. Moreover black worn powder which was considered to be formed by carbonization adhered to the sliding surface of the sliding bearing. After the lapse of 200 hours, the dynamic friction coefficient of the sliding bearing of the comparative example 2 in which the inner ring and the outer ring were made of the sintered metal and was operated by lubricating the sliding bearing with grease became not less than three times as high as the dynamic friction coefficient thereof at the initial stage. In addition the grease on the sliding surface was almost depleted.

Reference Example 1

Figure 8:
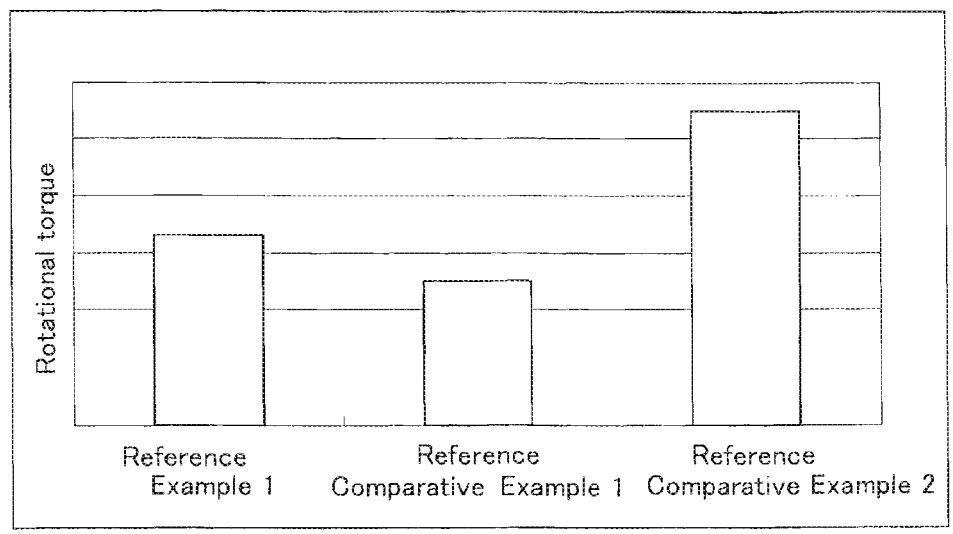
FIG. 8 is a bar graph showing results of a comparison test of a rotational torque.

The inner ring shown in FIG. 4 was produced by injection-molding a resin material, having a sliding property, which consisted of the PPS resin mixed with the fluororesin. As the synthetic resin material, BEAREE AS5054 (PPS resin-based composition), produced by NTN Engineering Plastics Corporation, which is precision resin was used. The outer ring shown in FIG. 1 was produced by injection-molding BEAREE AS5040, produced by NTN Engineering Plastics Corporation, which is a synthetic resin material composed of the PPS resin reinforced with glass fiber. The obtained sliding bearing had dimensions of φ30 mm in the inside diameter of its inner ring (convex curvature R: 16.75 mm), φ37 mm in the outside diameter of its outer ring (convex curvature R: 16.75 mm, outside diameter of flange: φ39 mm) thereof, and 7 mm in its total width (width of flange: 1 mm). As grease, 5 g of fluorine grease (Krytox GPL205 produced by DuPont Inc.) was uniformly applied to the grease-holding concave portion formed on the inner ring. Thereafter the inner ring was fitted on the outer ring to obtain a sliding bearing 11. The obtained sliding bearing 11 was subjected to a rotational torque test shown below to determine the rotational torque thereof. The results are shown in FIG. 8. Overall judgment made in consideration of the production cost is shown in table 2.

Reference Comparison Example 1

Except that a ball bearing (6706ZZ) produced by NTN Corporation provided with a snap ring (the inside, diameter of the inner ring, the outside diameter of the outer ring, and the width thereof were equal to those of the sliding bearing used in the reference example 1) was used as the bearing specimen, a test and evaluation similar to those of the reference example 1 were conducted. The results are shown in FIG. 8 and table 2.

Reference Comparative Example 2

Except that a sliding bearing (the dimension was equal to that of the sliding bearing used in the reference example 1) obtained by injection-molding a resin material, having a sliding property, which was composed of PPS resin-based composition containing 30 wt % of the fluororesin was used as the bearing specimen, a test and evaluation similar to those of the reference example 1 were conducted. The results are shown in FIG. 8 and table 2.
<Rotational Torque Test>
By using the shaft-heating type high temperature radial testing machine shown in FIG. 6, the rotational torques of the sliding bearings 11 were measured. Except that the number of rotations of the fixing roller 12 was set to 73 rpm and the test period of time was set to 50 hours, the test was conducted in the same conditions as those of the friction and wear test. The rotational torques of the sliding bearings 11 were calculated by measuring the rotational forces of the housing 15 which rotated together with the sliding bearings 11 by the load cell (not shown in the drawings).

<Production Cost>

The production costs (calculation cost) were quantified in relative evaluation and recorded, supposing that the production cost of the reference example 1 was 100.

<Overall Judgment>

In consideration of the results of the rotational torque test shown in FIG. 8 and the production costs shown in table 2, the specimen not inferior in the rotational torque nor the calculated cost was comprehensively judged that they were preferable in the balance between the rotational torque and the calculated cost and were marked by "o". Specimens inferior in any one of the rotational torque and the calculated cost were comprehensively judged that they were unpreferable in the balance therebetween and were marked by "x",

TABLE 2

|  | Reference Example 1 | Reference Comparative Example 1 | Reference Comparative Example 2 |
|---|---|---|---|
| calculated cost. | 100 | 180 | 45 |
| overall judgment | o | x | x |

As a result of the torque comparison test shown in FIG. 8, it was confirmed that the rotational torque of the sliding bearing of the reference example 1 was higher than that of the hall bearing of the reference comparative example 1 by about 13% and was lower than that of the sliding bearing of the reference comparative example 2 made of the resin by about 17%. As apparent from the results shown in table 2, it was found that the sliding bearing of the reference example 1 was comprehensively superior to the sliding bearing made of the resin and not having the grease-holding concave portion and the ball bearing.

INDUSTRIAL APPLICABILITY

The sliding hearing of the present invention is constructed of the outer ring and the inner ring. The outer ring is made of the synthetic resin and the inner ring is made of the sintered metal, or the outer ring is made of the sintered metal and the inner ring is made of the synthetic resin. The inner circumferential surface of the outer ring and the outer circumferential surface of the inner ring slide relative to each other. Therefore the sliding hearing is excellent in its heat releasability, can be formed in the same size as that of the rolling bearing and is thus compatible therewith, and can be produced at a small number of production steps. Therefore the production cost of the sliding bearing and the unit price of the product thereof are inexpensive. Therefore the sliding bearing of the present invention can be preferably utilized to support the heat roller such as the fixing roller, the pressure roller, and the like of the fixing device of the image-forming apparatus such as a copying machine, a printer, a facsimile, and the like.

EXPLANATION OF REFERENCE SYMBOLS AND NUMERALS

| 1: | sliding bearing |
|---|---|
| 2: | inner ring |
| 2a: | central portion of inner ring in its width direction |
| 3: | outer ring |
| 3a: | lower part of outer ring |
| 3b: | upper part of outer ring |
| 3c: | pin |
| 3d: | pin hole |
| 3e: | inner ring fit-on groove |

-continued

EXPLANATION OF REFERENCE SYMBOLS AND NUMERALS

| 4: | dimple |
|---|---|
| 5: | groove (grease-holding groove) |
| 5a: | side of rectangle disposed at rotational direction side |
| 5b: | side of rectangle opposed to 5a |
| 10: | shaft-heating type high temperature radial testing machine |
| 11: | sliding bearing |
| 12: | fixing roller |
| 13: | rod-like heater |
| 14: | thermocouple |
| 15: | housing |
| 16: | load |
| 17: | ball bearing |
| 18: | coupling |
| 19: | driving motor |

The invention claimed is:

1. A sliding bearing comprising an outer ring and an inner ring, wherein said outer ring is made of synthetic resin and said inner ring is made of a sintered metal, or said outer ring is made of a sintered metal and said inner ring is made of synthetic resin; and an inner circumferential surface of said outer ring and an outer circumferential surface of said inner ring slide relative to each other, wherein said outer ring is made of synthetic resin and said inner ring is made of sintered metal, or said outer ring is made of sintered metal and said inner ring is made if synthetic resin, wherein crease is enclosed between said inner ring and said outer ring; and a grease-holding concave portion for holding said grease therein is formed on said outer circumferential surface of said inner ring.

2. The sliding bearing, according to claim 1, which includes a heat roller supported by said sliding bearing wherein said heat roller is adapted to be to be heated by heat transferred from a heater incorporated in said heat roller or from other members.

3. The sliding bearing according to claim 2, wherein said heat roller is a fixing roller of an image-forming apparatus or a pressure roller thereof.

4. The sliding bearing according to claim 1, wherein said outer ring is composed of two radially divided parts; and said inner ring is fitted on said outer ring by sandwiching said inner ring between said two divided parts of said outer ring in such a way that said inner circumferential surface of said outer ring and said outer circumferential surface of said inner ring slide relative to each other.

5. The sliding bearing according to claim 1, wherein an inner ring fit-on groove is formed at two opposed positions of said inner circumferential surface of said outer ring in such a way that said inner ring fit-on groove is disposed on at least one end surface of said outer ring; and said inner ring is fitted on said outer ring through said inner ring fit-on groove.

6. The sliding bearing according to claim 5, wherein said inner ring is fitted on said outer ring by inserting said inner ring into said outer ring via said inner ring fit-on groove in a state where said inner ring and that of said outer ring have an axis of rotation and are shifted from each other and thereafter rotating said inner ring and said outer ring relative to each other to align said axis of rotation of said inner ring and that of said outer ring with each other.

7. The sliding bearing according to claim 1, wherein a depth of said grease-holding concave portion at a deepest portion thereof is 0.03 to 0.7 mm.

8. The sliding bearing according to claim 1, wherein said synthetic resin is a resin composition containing a solid lubricant.

9. The sliding bearing according to claim 8, wherein a base resin of said resin composition is polyphenylene sulfide resin.

10. The sliding bearing according to claim 1, wherein said sintered metal contains copper and/or iron as a main component thereof.

11. The sliding bearing according to claim 1, wherein said grease is fluorine grease and/or urea grease.

12. The sliding bearing according to claim 1, wherein said inner ring is made of said sintered metal; and said outer ring is made of said synthetic resin.

13. The sliding bearing according to claim 1, wherein said inner ring is made of said synthetic resin; and said outer ring is made of said sintered metal.

14. A sliding bearing comprising an outer ring and an inner ring, wherein said outer ring is made of synthetic resin and said inner ring is made of a sintered metal, or said outer ring is made of a sintered metal and said inner ring is made of synthetic resin; and an inner circumferential surface of said outer ring and an outer circumferential surface of said inner ring slide relative to each other,
 wherein said outer ring is made of synthetic resin and said inner ring is made of sintered metal, or said outer ring is made of sintered metal and said inner ring is made if synthetic resin,
 wherein grease is enclosed between said inner ring and said outer ring; and a grease-holding concave portion for holding said grease therein is formed on said outer circumferential surface of said inner ring, wherein said grease-holding concave portion is formed as inverted cone-shaped dimples, having a diameter of 0.3 to 2.0 mm, which are formed on an entire outer circumferential surface of said inner ring.

15. The sliding hearing according to claim 14, wherein each of said dimples has an approach angle of 10 to 45° at an open portion thereof.

16. A sliding bearing comprising an outer ring and an inner ring, wherein said outer ring is made of synthetic resin and said inner ring is made of a sintered metal, or said outer ring is made of a sintered metal and said inner ring is made of synthetic resin; and an inner circumferential surface of said outer ring and an outer circumferential surface of said inner ring slide relative to each other,
 wherein said outer ring is made of synthetic resin and said inner ring is made of sintered metal, or said outer ring is made of sintered metal and said inner ring is made if synthetic resin,
 wherein grease is enclosed between said inner ring and said outer ring; and a grease-holding concave portion for holding said grease therein is formed on said outer circumferential surface of said inner ring, wherein said grease-holding concave portion is formed on an entire outer circumferential surface of said inner ring as a plurality of rectangular grooves arranged in two rows in such a way that said rectangular grooves form an angled pattern where each pair of said rectangular grooves of said two rows converge towards one another at a first end but do not contact one another and each pair of said rectangular grooves, at a second end are spaced further apart than at said first end to form said angled pattern where said second end of each pair of rectangular grooves faces a rotational direction of said inner ring.

17. The sliding bearing according to claim 16, wherein each of said rectangular grooves is formed as an inclined groove which becomes gradually deeper from a side of said rectangle facing said rotational direction of said inner ring toward an opposed side thereof.

* * * * *